US011755650B2

(12) United States Patent
Nakatsuma et al.

(10) Patent No.: US 11,755,650 B2
(45) Date of Patent: Sep. 12, 2023

(54) INFORMATION PROVIDING SYSTEM, INFORMATION PROCESSING DEVICE, AND INFORMATION PROVIDING METHOD

(71) Applicant: Mitsubishi Electric Corporation, Tokyo (JP)

(72) Inventors: Saki Nakatsuma, Tokyo (JP); Kazuhiko Yamada, Tokyo (JP); Misato Naito, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 410 days.

(21) Appl. No.: 16/398,810

(22) Filed: Apr. 30, 2019

(65) Prior Publication Data

US 2019/0392004 A1    Dec. 26, 2019

(30) Foreign Application Priority Data

Jun. 21, 2018  (JP) ................................ 2018-117607

(51) Int. Cl.
*G06F 16/9032*  (2019.01)
*G06F 16/9035*  (2019.01)
(Continued)

(52) U.S. Cl.
CPC ........ *G06F 16/90328* (2019.01); *G06F 3/015* (2013.01); *G06F 3/017* (2013.01);
(Continued)

(58) Field of Classification Search
CPC ............... G06F 16/9035; G06F 16/909; G06F 2203/011; G06F 16/90328; G06Q 30/0261; G06Q 30/0267
See application file for complete search history.

(56) References Cited

U.S. PATENT DOCUMENTS 10,026,099 B1\*  7/2018  Joshi ................. G06Q 30/0251
10,096,043 B2\*  10/2018  Beck ................. G06Q 30/0207
(Continued)

FOREIGN PATENT DOCUMENTS

JP    H11-065434 A    3/1999
JP    2001-344352 A   12/2001
(Continued)

OTHER PUBLICATIONS

Office Action dated Oct. 5, 2021 in corresponding Japanese Application No. 2018-117607.
(Continued)

*Primary Examiner* — Charles D Adams
(74) *Attorney, Agent, or Firm* — Birch, Stewart, Kolasch & Birch, LLP

(57) ABSTRACT

An information providing system includes: a terminal device that acquires biological information as information on a user and transmits the biological information; and an information processing device, wherein the information processing device receives the biological information from the terminal device, analyzes condition of the user based on the biological information, judges whether content should be provided to the terminal device or not based on a result of the analyzing, and provides the content to the terminal device when judging that the content should be provided to the terminal device.

6 Claims, 13 Drawing Sheets

(51) Int. Cl.
*G06Q 30/0251* (2023.01)
*G06F 3/01* (2006.01)

(52) U.S. Cl.
CPC ..... *G06F 16/9035* (2019.01); *G06Q 30/0261* (2013.01); *G06Q 30/0267* (2013.01); *G06F 2203/011* (2013.01)

(56) References Cited

U.S. PATENT DOCUMENTS

| | | |
|---|---|---|
| 2001/0049471 A1 | 12/2001 | Suzuki et al. |
| 2011/0152637 A1* | 6/2011 | Kateraas ............ A61B 5/02055 600/301 |
| 2012/0317066 A1 | 12/2012 | Miyazaki |
| 2016/0171546 A1* | 6/2016 | Gartenberg ........ G06Q 30/0261 705/14.58 |
| 2017/0228752 A1* | 8/2017 | Buckman ........... G06Q 30/0267 |
| 2019/0333077 A1 | 10/2019 | Nakaoka |

FOREIGN PATENT DOCUMENTS

| | | |
|---|---|---|
| JP | 2007-147468 A | 6/2007 |
| JP | 2008-226206 A | 9/2008 |
| JP | 2009-009175 A | 1/2009 |
| JP | 2011-123035 A | 6/2011 |
| JP | 2015-032189 A | 2/2015 |
| WO | WO 2011/114620 A1 | 9/2011 |
| WO | WO 2018/092333 A1 | 5/2018 |
| WO | WO 2018/131222 A1 | 7/2018 |
| WO | WO 2018/142680 A1 | 8/2018 |

OTHER PUBLICATIONS

Office Action dated May 10, 2022 in corresponding Japanese Patent Application No. 2018-117607.

* cited by examiner

FIG. 3

TRANSMISSION DATA TABLE 441

| STORE | POSITION INFORMATION | CATEGORY INFORMATION |
|---|---|---|
| A | 01 | 0 |
| B | 02 | 0 |
| C | 03 | 1 |
| D | 04 | 3 |
| E | 11 | 0 |
| F | 12 | 1 |
| G | 13 | 2 |
| H | 14 | 3 |

FIG. 4

CATEGORY INFORMATION TABLE 442

| CATEGORY | CATEGORY INFORMATION |
|---|---|
| FASHION | 0 |
| GOODS | 1 |
| SERVICE | 2 |
| FOOD | 3 |

FIG. 9

USER CONDITION JUDGMENT TABLE (431)

| | BIOLOGICAL INFORMATION | | USER CONDITION |
|---|---|---|---|
| | PULSE RATE | ACCELERATION (MOVING SPEED) | |
| INCREASE AND DECREASE INFORMATION | CONSTANT | CONSTANT | NORMAL |
| | INCREASE | — | TENSION |
| | INCREASE | INCREASE | IMPATIENCE |
| | — | DECREASE | FATIGUE |

FIG. 10

USER CONDITION INFORMATION TABLE (432)

| USER CONDITION | USER CONDITION INFORMATION |
|---|---|
| NORMAL | 0 |
| FATIGUE | 1 |
| IMPATIENCE | 2 |
| TENSION | 3 |

FIG. 11

MANAGEMENT TABLE (443)

| ACQUISITION TIME | USER ID | POSITION INFORMATION | CATEGORY INFORMATION |
|---|---|---|---|
| 18/03/19, 11:10 | U01 | STORE A | FASHION |
| 18/03/19, 11:30 | U01 | STORE B | FASHION |
| 18/03/19, 11:45 | U02 | STORE G | SERVICE |
| 18/03/19, 12:05 | U01 | STORE D | FOOD |

FIG. 12

| RELEVANT CATEGORY INFORMATION TABLE | 451 |
|---|---|
| CATEGORY INFORMATION | RELEVANT CATEGORY INFORMATION |
| FASHION | GOODS |
| GOODS | FASHION |
| SERVICE | GOODS |
| FOOD | GOODS |

FIG. 13

FACILITY INFORMATION TABLE 461

| POSITION INFORMATION | CATEGORY INFORMATION | CONTENT | PROVISION ITEM INFORMATION | EVENT INFORMATION |
|---|---|---|---|---|
| STORE A | FASHION | STORE GUIDE | 6 | NONE |
| STORE B | FASHION | SALES GUIDE | 6 | 15:00 – 16:00 |
| STORE C | GOODS | STORE GUIDE | 6 | NONE |
| STORE D | FOOD | STORE GUIDE | 5 | NONE |
| STORE E | FASHION | STORE GUIDE | 2 | NONE |
| STORE F | GOODS | STORE GUIDE | 10 | NONE |
| STORE G | SERVICE | STORE GUIDE | 4 | NONE |
| STORE H | FOOD | COUPON | 19 | 11:00 – 12:00 |

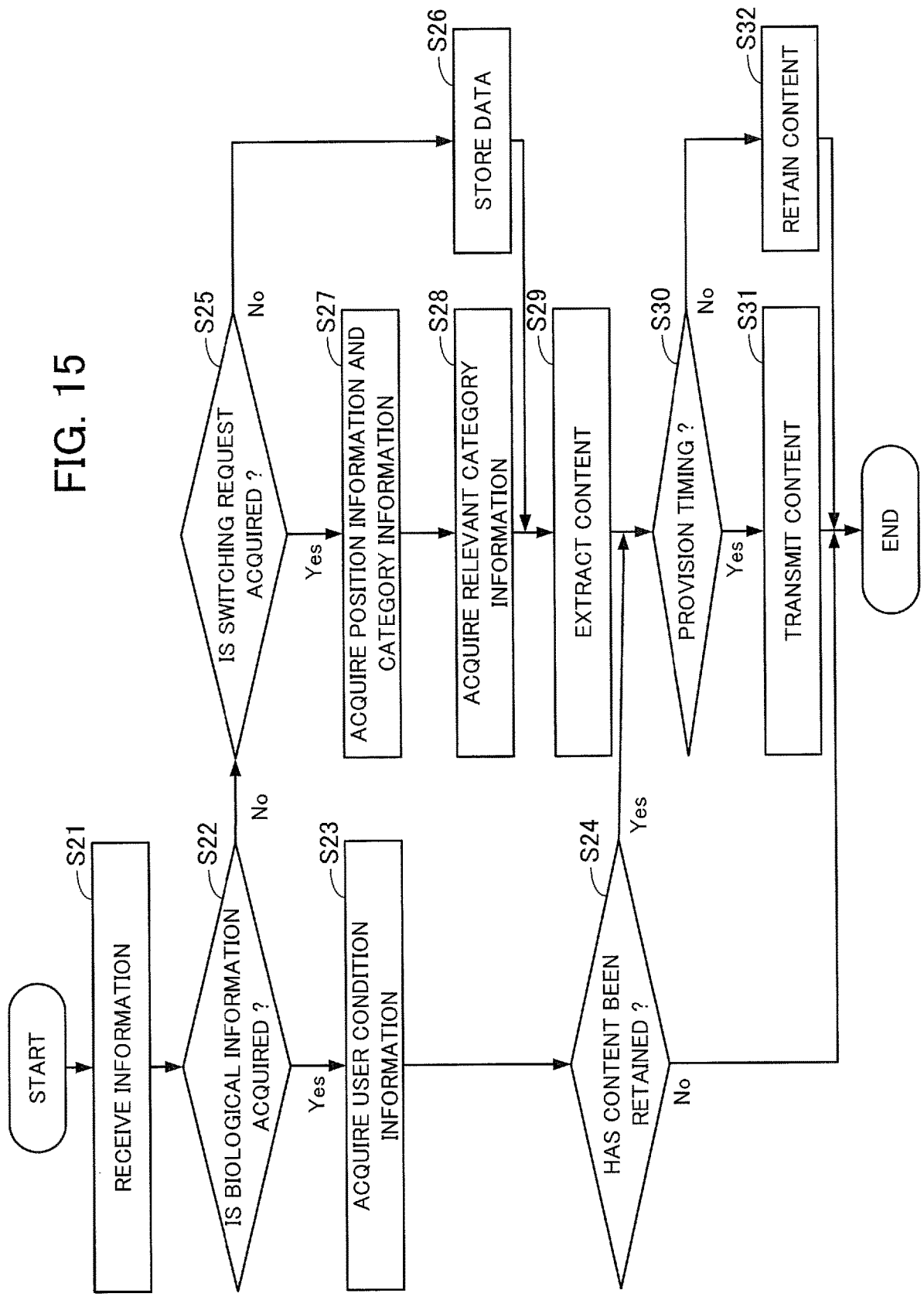

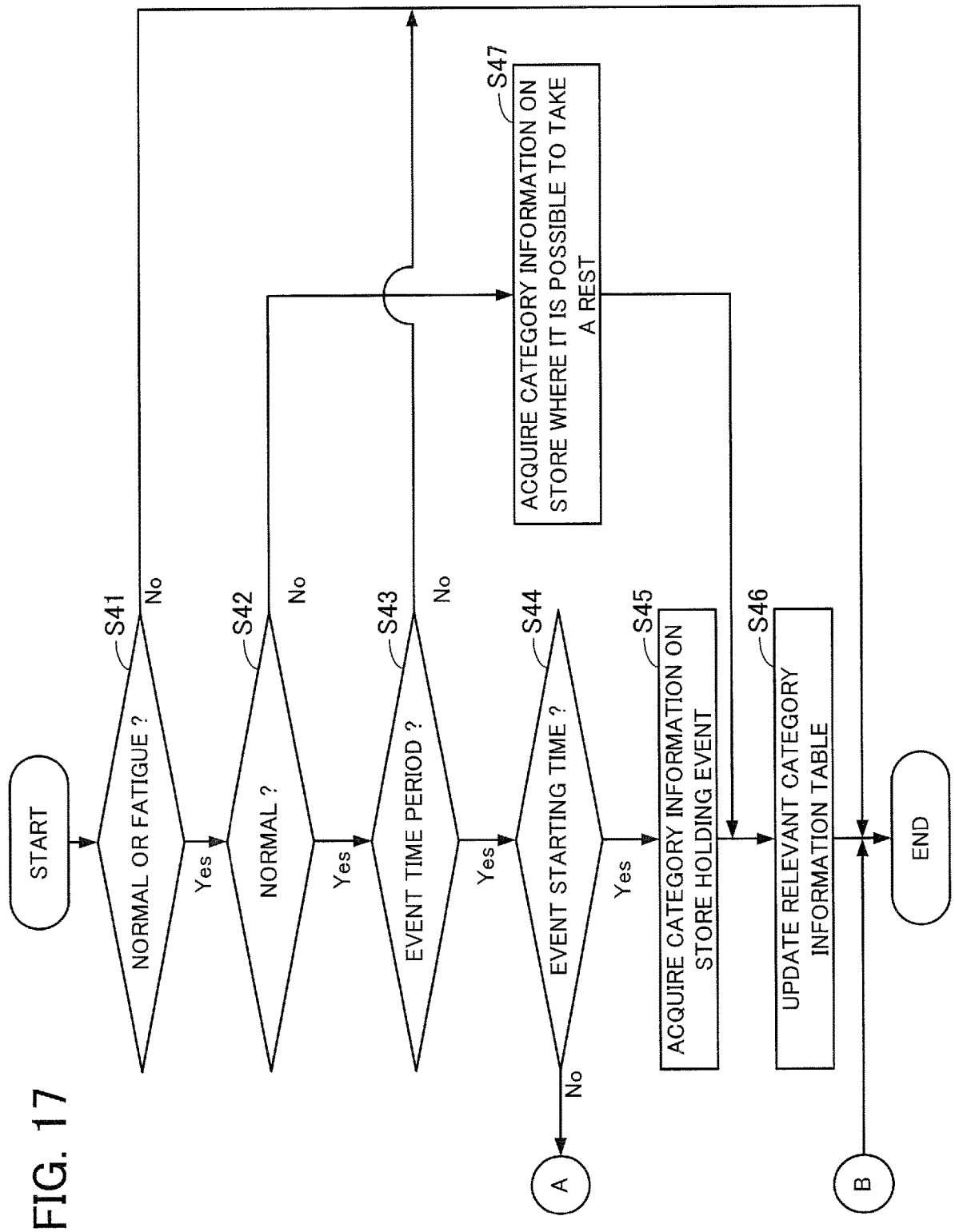

INFORMATION PROVIDING SYSTEM, INFORMATION PROCESSING DEVICE, AND INFORMATION PROVIDING METHOD

BACKGROUND OF THE INVENTION

1. Field of the Invention

The present invention relates to an information providing system, an information processing device, and an information providing method.

2. Description of the Related Art

In recent years, Global Positioning System (GPS) and short-range wireless communication such as Bluetooth (registered trademark) Low Energy (BLE) are used. For example, the position of a user carrying a mobile information terminal such as a smartphone is detected by use of GPS or short-range wireless communication. Further, the mobile information terminal has various sensors such as an acceleration sensor and a gyro sensor installed therein. Thus, the mobile information terminal is also capable of detecting motion of the user carrying the mobile information terminal. Here, a system for providing a user with information corresponding to the position and the motion of the user has been proposed. See WO 2011/114620 (Patent Reference 1).

For example, the Patent Reference 1 describes a system that calculates an area interest level indicating the degree and tendency of the user's interest in an area, based on behavioral condition of the user. The system calculates the area interest level regarding an area in which the user stayed based on user's walking condition (e.g., walking, squatting, crouching, etc.) and area staying time detected with the GPS and an acceleration sensor of a mobile information terminal carried by the user. The system displays content on a screen of the mobile information terminal or a display device placed nearby based on the calculated area interest level.

The system described in the Patent Reference 1 provides content to the user without considering the condition of the user. The system provides the user with content even when the user does not need the content, and thus makes the user feel troublesome and discomfort.

SUMMARY OF THE INVENTION

The object of the present invention is to provide content to the user with appropriate timing.

There is provided an information providing system according to an aspect of the position. The information providing system includes a terminal device and an information processing device. The terminal device acquires biological information as information on a user and transmits the biological information. The information processing device receives the biological information from the terminal device, analyzes condition of the user based on the biological information, judges whether content should be provided to the terminal device or not based on a result of the analyzing, and provides the content to the terminal device when judging that the content should be provided to the terminal device.

According to the present invention, content can be provided to the user with appropriate timing.

BRIEF DESCRIPTION OF THE DRAWINGS

In the attached drawings:

FIG. 3 is a diagram showing a transmission data table;

FIG. 4 is a diagram showing a category information table;

FIG. 9 is a diagram showing a user condition judgment table;

FIG. 10 is a diagram showing a user condition information table;

FIG. 11 is a diagram showing a management table;

FIG. 12 is a diagram showing a relevant category information table;

FIG. 13 is a diagram showing a facility information table;

FIG. 15 is a flowchart showing a content transmission process;

FIG. 17 is a flowchart (part 1) showing update processing of a relevant category information table.

DETAILED DESCRIPTION OF THE INVENTION

An embodiment will be described below with reference to the drawings. The embodiment described below is just an example; a variety of modifications are possible within the scope of the present invention.

Embodiment (Information Providing System)

Figure 1:
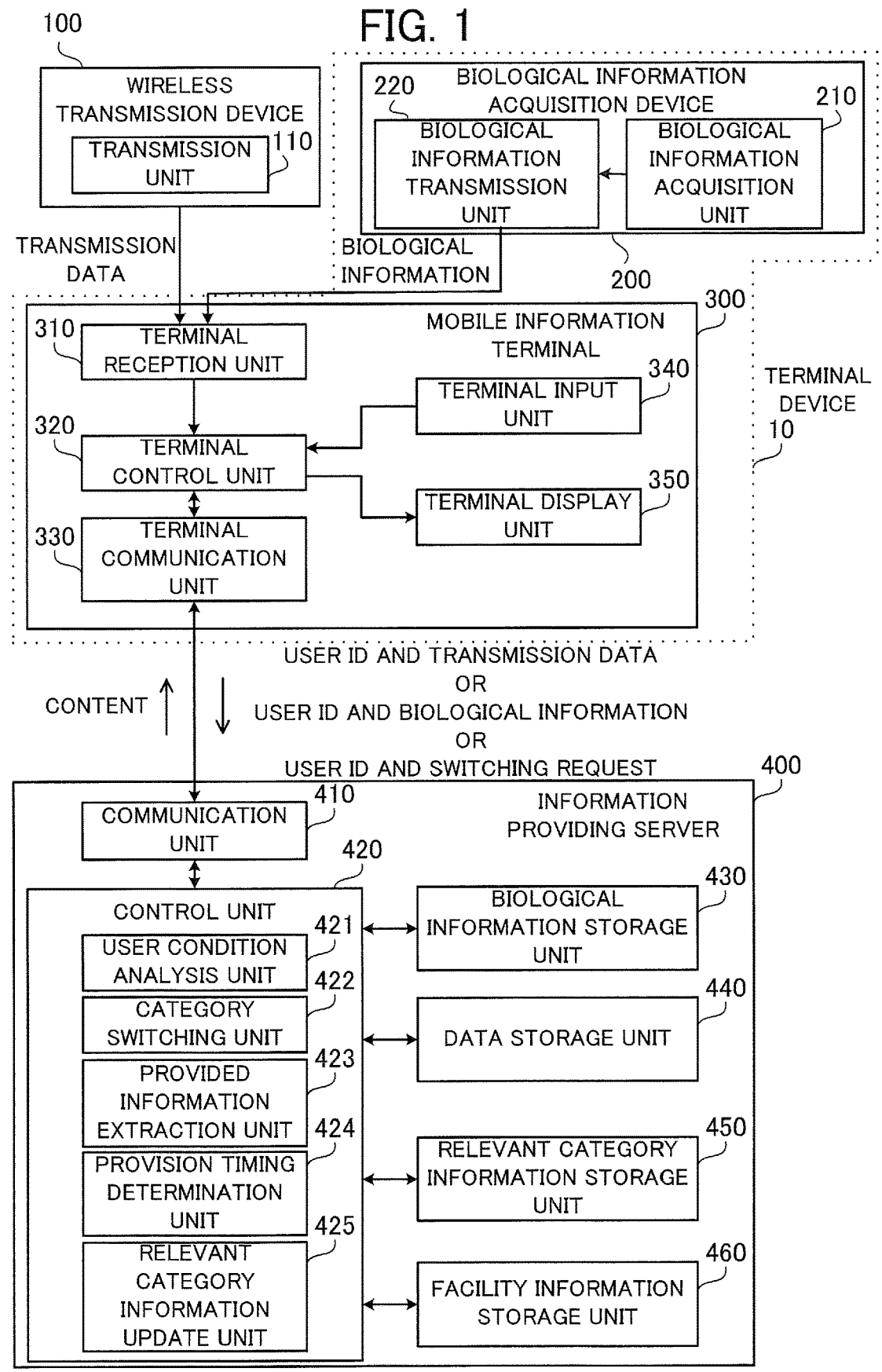
FIG. 1 is a diagram showing an information providing system.

FIG. 1 is a diagram showing an information providing system. The information providing system includes a terminal device 10 and an information providing server 400. The terminal device 10 includes a biological information acquisition device 200 and a mobile information terminal 300. Further, the information providing system may include a wireless transmission device 100. The terminal device 10 and the information providing server 400 are capable of executing an information providing method.

The wireless transmission device 100 performs wireless communication with the mobile information terminal 300. The biological information acquisition device 200 performs wireless communication with the mobile information terminal 300. The mobile information terminal 300 performs wireless communication with the information providing server 400.

The biological information acquisition device 200 is worn by a user. The mobile information terminal 300 is a terminal the user uses. The mobile information terminal 300 may be represented as a terminal held or carried by the user. The information providing server 400 is referred to also as an information processing device.

For example, the wireless transmission device 100 and the information providing server 400 are installed in a commercial facility such as a shopping mall.

Figure 2:
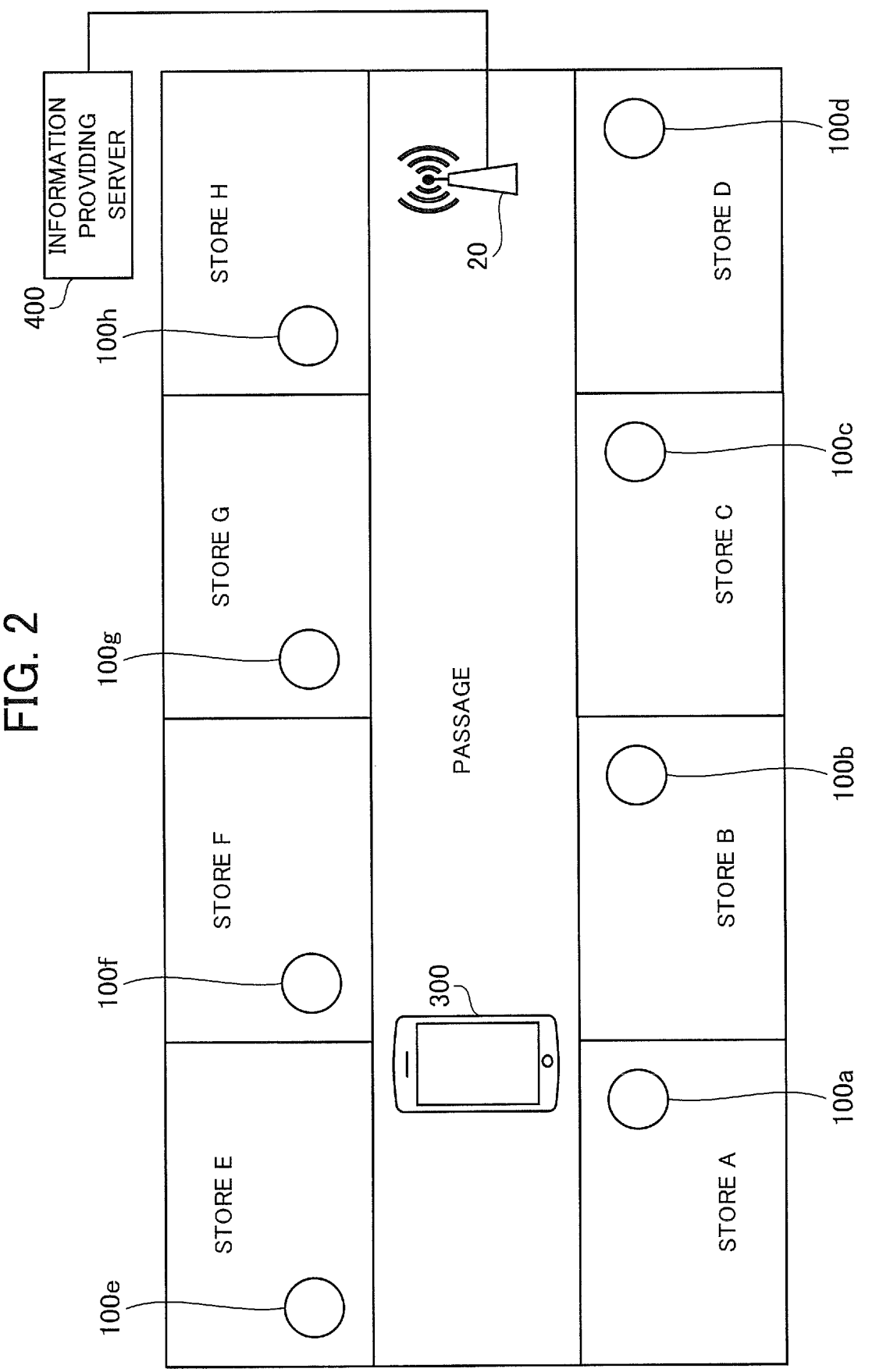
FIG. 2 is a diagram showing an example of a plurality of stores arranged in a commercial facility.

FIG. 2 is a diagram showing an example of a plurality of stores arranged in a commercial facility. FIG. 2 shows a state in which wireless transmission devices 100 (namely, wireless transmission devices 100*a* to 100*h*) have been respectively installed in stores A to H. Incidentally, the wireless transmission device 100 may be regarded as a generic name for the wireless transmission devices 100*a* to 100*h*. Further, the plurality of stores may be represented also as a plurality of areas.

FIG. 2 shows a case where a user using the mobile information terminal 300 is situated in a passage. The mobile information terminal 300 connects to the information providing server 400 via an access point 20. The mobile information terminal 300 is capable of receiving content from the information providing server 400. The mobile information terminal 300 displays the received content. In this way, the user can acquire beneficial information.

Returning to FIG. 1, the information providing system will be described briefly.

The terminal device 10 acquires biological information on the user. The terminal device 10 transmits the biological information. The information providing server 400 receives the biological information from the terminal device 10. The information providing server 400 analyzes condition of the user based on the biological information. The information providing server 400 judges whether content should be provided to the terminal device 10 or not based on a result of the analyzing. The information providing server 400 provides the content to the terminal device 10 when judging that the content should be provided to the terminal device 10. By this operation, the information providing system is capable of providing the user with the content appropriate timing.

Next, the information providing system will be described in detail. First, the wireless transmission device 100 will be described in detail.

(Wireless Transmission Device 100)

The wireless transmission device 100 includes a transmission unit 110. Further, the wireless transmission device 100 includes a control unit (not shown) that controls the transmission unit 110 and a storage unit (not shown) that stores information.

Part or all of the transmission unit 110 may be implemented by a processor included in the wireless transmission device 100. Part or all of the transmission unit 110 may be implemented as a module of a program executed by the processor included in the wireless transmission device 100.

The transmission unit 110 transmits transmission data, including position information and category information on the store in which the wireless transmission device 100 has been installed, to the mobile information terminal 300.

Here, the position information and the category information on the stores will be explained.

FIG. 3 is a diagram showing a transmission data table. For example, the transmission data table 441 is stored in the information providing server 400. Specifically, the transmission data table 441 is stored in a data storage unit 440 of the information providing server 400 which will be described later.

The transmission data table 441 has items of store, position information and category information. The item of store indicates a store name. The item of position information indicates information for identifying each store. The position information on each store A-H is represented by unique information (e.g., unique numerical value). The item of category information indicates a category to which merchandise or service provided by the store belongs. The category is represented by information (e.g., numerical value) capable of identifying the category.

FIG. 4 is a diagram showing a category information table. For example, the category information table 442 is stored in the data storage unit 440 of the information providing server 400. The category information table 442 has items of category and category information.

The item of category indicates a category name of a category to which the merchandise handled by the store or the service provided by the store belongs. The item of category information indicates a number corresponding to the category. As above, the category information table 442 is information indicating correspondence relationship between each category and category information.

For example, according to the transmission data table 441 and the category information table 442, the category information on the store A belonging to a category of "fashion" is indicated as "0". Incidentally, stores belonging to the category of "fashion" are stores selling merchandise related to fashion such as clothes, shoes or bags. Further, the category information on the store C belonging to a category of "goods" is indicated as "1", for example. Incidentally, stores belonging to the category of "goods" are stores selling merchandise related to general goods such as interior goods or groceries.

The storage unit of each wireless transmission device 100 stores the position information and the category information registered in the transmission data table 441. For example, the storage unit of the wireless transmission device 100*a* stores position information "01" and category information "0". The storage unit of the wireless transmission device 100*b* stores position information "02" and category information "0". As above, each of the wireless transmission devices 100*a* to 100*h* stores the position information and the category information corresponding to the device itself.

The transmission unit 110 transmits the transmission data including the position information and the category information stored in the storage unit of the wireless transmission device 100, to the mobile information terminal 300. For example, the transmission unit of the wireless transmission device 100*a* transmits the transmission data including the position information "01" and the category information "0" to the mobile information terminal 300.

Here, the position information and the category information are generally represented by numerical values like those registered in the transmission data table 441 and the category information table 442. However, in the following description, the position information will be represented by A-H as the corresponding store names in order to facilitate the understanding. Further, the category information will be represented by the corresponding category names.

Next, the transmission of the transmission data will be described below.

The transmission unit 110 transmits the transmission data by means of short-range wireless communication. For example, the standard for short-range wireless communication is BLE as Bluetooth 4.0. In BLE, radio waves in the 2.4 GHz band are used. The communication range of BLE is a relatively narrow range of 2.5 m to 50 m. Therefore, the wireless transmission device 100 is capable of setting a receivable range of the transmission data as a limited region by adjusting the intensity of the radio waves transmitted by the transmission unit 110. With this setting, the mobile information terminal 300 is capable of receiving the transmission data from the transmission unit 110 when the mobile information terminal 300 is situated in the store or in a predetermined region.

The transmission data includes a Universally Unique Identifier (UUID), a Major value, and a Minor value. The UUID is a character string of 128 bits long. The Major value is an integer of 16 bits long. The Minor value is an integer of 16 bits long.

In general, a unique value capable of identifying the wireless transmission device is set to the UUID. For example, the position information is set to the UUID. To the Major value and the Minor value, arbitrary values are set as data regions. For example, the category information is set to the Major value and the Minor value.

The transmission unit 110 transmits the transmission data repeatedly. For example, the transmission unit 110 transmits the transmission data periodically at predetermined intervals. Incidentally, the transmission interval in the BLE standard is 20 ms (milliseconds) to 10.24 s (seconds). The transmission unit 110 is assumed to transmit the transmission data at 100 ms intervals. However, the transmission unit 110 may transmit the transmission data at intervals other than 100 ms as long as the interval is within the range stipulated in the BLE standard.

Next, returning to FIG. 1, the biological information acquisition device 200 will be described in detail.

(Biological Information Acquisition Device 200)

The biological information acquisition device 200 is worn by the user. The shape of the biological information acquisition device 200 is the wristband type to be worn around the wrist, or the eyeglass type. However, the shape of the biological information acquisition device 200 can differ from these types.

The biological information acquisition device 200 includes a sensor (not shown). For example, the sensor is an acceleration sensor, an angular speed sensor, a pulse sensor, a temperature and humidity sensor, or the like. The biological information acquisition device 200 is capable of grasping body condition of the user or motion of the user by using the sensor. For example, by using the sensor, the biological information acquisition device 200 is capable of grasping the body condition of the user or the motion of the user based on information on biological condition of the user such as the amount of activity, the pulse rate or the body temperature of the user.

The biological information acquisition device 200 includes a biological information acquisition unit 210 and a biological information transmission unit 220. The biological information acquisition device 200 may include a control unit (not shown) that controls the biological information acquisition unit 210 and the biological information transmission unit 220 and a storage unit (not shown) that stores information.

Part or all of the biological information acquisition unit 210 and the biological information transmission unit 220 may be implemented by a processor included in the biological information acquisition device 200. Part or all of the biological information acquisition unit 210 and the biological information transmission unit 220 may be implemented as a module of a program executed by the processor included in the biological information acquisition device 200.

The biological information acquisition unit 210 acquires a sensor value from the sensor. Alternatively, the biological information acquisition unit 210 can acquire a plurality of sensor values (i.e., various types of sensor values) from a plurality of sensors. Here, the sensor value or the various types of sensor values acquired by the biological information acquisition unit 210 are referred to also as biological information. Namely, the biological information is information regarding the user. For example, the biological information is the pulse rate.

The biological information transmission unit 220 transmits the sensor value(s) acquired by the biological information acquisition unit 210 (i.e., the biological information) to the mobile information terminal 300. When transmitting the biological information, the biological information transmission unit 220 transmits the biological information to the mobile information terminal 300 by means of short-range wireless communication (e.g., BLE).

When transmitting the biological information by means of BLE, the biological information transmission unit 220 may set the sensor value or the various types of sensor values to the region of the Major value or the Minor value. Further, the biological information transmission unit 220 transmits the biological information periodically within the range stipulated in the BLE standard.

Due to this process, the mobile information terminal 300 receives the biological information.

(Mobile Information Terminal 300)

The mobile information terminal 300 is a smartphone, a tablet terminal, a cellular phone, a Personal Computer (PC), or the like.

The mobile information terminal 300 includes a terminal reception unit 310, a terminal control unit 320, a terminal communication unit 330, a terminal input unit 340 and a terminal display unit 350.

Here, hardware included in the mobile information terminal 300 will be explained.

Figure 5:
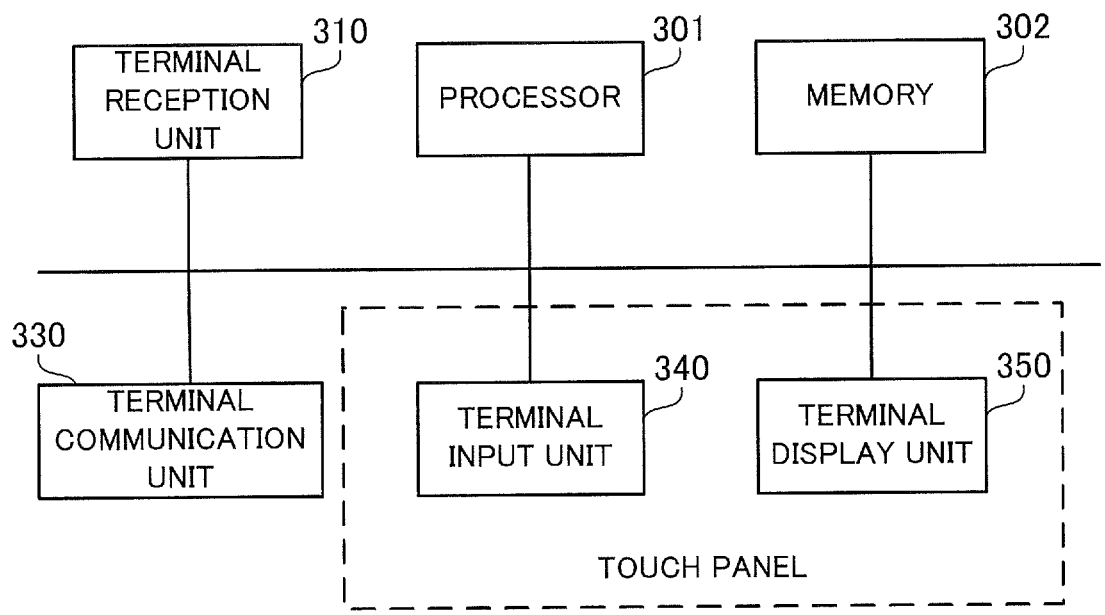
FIG. 5 is a diagram showing hardware included in a mobile information terminal.

FIG. 5 is a diagram showing the hardware included in the mobile information terminal. The mobile information terminal 300 includes a processor 301 and a memory 302.

Part or all of the terminal control unit 320 may be implemented by the processor 301. Part or all of the terminal control unit 320 may be implemented as a module of a program executed by the processor 301. The terminal control unit 320 may also be implemented based on the processor 301 and part of the memory 302.

Further, part of the terminal reception unit 310, the terminal communication unit 330, the terminal input unit 340 and the terminal display unit 350 may be implemented by the processor 301. Part of the terminal reception unit 310, the terminal communication unit 330, the terminal input unit 340 and the terminal display unit 350 may also be implemented as a module of a program executed by the processor 301. Further, part of the terminal reception unit 310, the terminal communication unit 330, the terminal input unit 340 and the terminal display unit 350 may also be implemented based on the processor 301 and the memory 302.

The terminal input unit 340 and the terminal display unit 350 may be implemented as a touch panel. Alternatively, the terminal input unit 340 and the terminal display unit 350 may be components different from each other. For example, the terminal input unit 340 is an operation button. The terminal display unit 350 is a display.

Returning to FIG. 1, the description will be continued.

The terminal reception unit 310 receives information from the wireless transmission device 100 and the biological information acquisition device 200. For example, the terminal reception unit 310 receives information by means of BLE.

The terminal reception unit 310 receives the transmission data from the wireless transmission device 100. The terminal reception unit 310 detects the intensity of the received radio wave at the time of receiving the transmission data. The terminal reception unit 310 judges whether the transmission data should be transmitted to the terminal control unit 320 or not based on the detected intensity. The procedure of the judgment will be described in detail below. The intensity of the received radio wave at the time when the terminal reception unit 310 receives the transmission data becomes higher with the decrease in the distance between the position of the wireless transmission device 100 and the position of the mobile information terminal 300. The terminal reception unit 310 makes the judgment on whether the transmission data should be transmitted to the terminal control unit 320 or not by using this characteristic. In order to use this characteristic, a reference value of the intensity of the received radio wave when the mobile information terminal 300 can be judged to be situated in the store or in the vicinity of the store has been stored in the memory 302. The terminal reception unit 310 transmits the transmission data to the terminal control unit 320 if the intensity of the received radio wave at the time of receiving the transmission data from the wireless transmission device 100 is over the reference value. The terminal reception unit 310 does not transmit the transmission data to the terminal control unit 320 if the intensity of the received radio wave is less than or equal to the reference value.

Further, the terminal reception unit 310 receives the biological information from the biological information acquisition device 200. The terminal reception unit 310 transmits the biological information to the terminal control unit 320.

The terminal control unit 320 controls the whole of the mobile information terminal 300. The terminal communication unit 330 communicates with the information providing server 400. For example, the communication is wireless communication according to specifications like Wireless Fidelity (Wifi). Incidentally, Wifi is a registered trademark.

The terminal input unit 340 is an input interface of the mobile information terminal 300. The terminal input unit 340 receives a switching request made by an operation by the user. The switching request is a request for switching the content displayed on the terminal display unit 350. As will be described later, the terminal input unit 340 receives the switching request when a CHANGE button displayed on the terminal display unit 350 is operated by the user.

The terminal input unit 340 transmits the switching request to the terminal control unit 320. For example, in a case where the mobile information terminal 300 is a smartphone, the terminal input unit 340 as a touch panel receives the switching request when the user operates the touch panel. Then, the terminal input unit 340 transmits the switching request to the terminal control unit 320. Incidentally, the user operation on the touch panel is, for example, the action of tapping, as the operation of touching a prescribed position on the screen of the touch panel with a finger, or the action of swiping, as the operation of sliding a finger in a predetermined direction on the screen of the touch panel.

The terminal display unit 350 is an output interface of the mobile information terminal 300. The terminal display unit 350 displays content (i.e., content data). For example, the content is introduction information regarding a store in the commercial facility, event information regarding a limited-time sale or the like in the commercial facility, information regarding a coupon usable in a store in the commercial facility, or the like. The content is textual information, a still image, motion video, or a combination thereof.

Next, a concrete example of a state in which content is displayed on the terminal display unit 350 will be described below.

Figure 6:
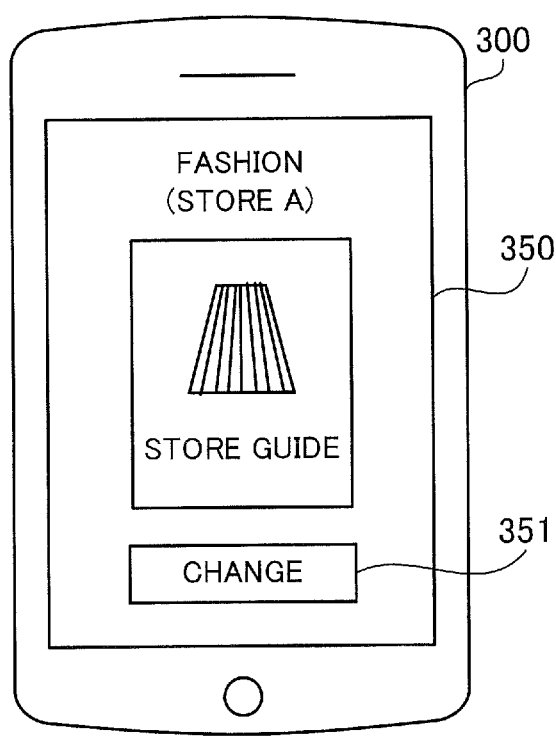
FIG. 6 is a diagram showing an example of a display screen of the mobile information terminal.

FIG. 6 is a diagram showing an example of a display screen of the mobile information terminal. FIG. 6 shows a state in which a store guide about the store A belonging to the category "fashion" is displayed on the terminal display unit 350.

Further, the CHANGE button 351 is displayed on the terminal display unit 350. The CHANGE button 351 may also be represented as a switching button. The CHANGE button 351 is a button for switching the content displayed on the terminal display unit 350. For example, the terminal input unit 340 acquires the switching request when the user depresses the CHANGE button 351. As will be described later, the mobile information terminal 300 can receive content regarding a store belonging to a category other than fashion from the information providing server 400 when the CHANGE button 351 is depressed.

Returning to FIG. 1, the description will be continued.

The terminal control unit 320 transmits a user identifier (ID) and the transmission data, the user ID and the biological information, or the user ID and the switching request to the information providing server 400 via the terminal communication unit 330. The user ID is a unique identifier capable of identifying the user carrying the mobile information terminal. The user ID is "U01", for example. For example, the mobile information terminal 300 previously acquires the user ID from a server managing the user ID via a network.

Here, the transmission data transmitted to the information providing server 400 can be part of the transmission data (i.e., information based on the transmission data).

The terminal control unit 320 acquires content based on the user ID and the transmission data or based on the user ID and the switching request from the information providing server 400 via the terminal communication unit 330. The terminal control unit 320 transmits the acquired content to the terminal display unit 350. Accordingly, the terminal display unit 350 is capable of displaying the content.

When the transmission data is received from a different wireless transmission device after the user moved and the user is in a condition of being capable of viewing content, the terminal control unit 320 can acquire new content from the information providing server 400 via the terminal communication unit 330. Accordingly, the terminal display unit 350 is capable of displaying the new content.

(Information Providing Server 400)

The information providing server 400 includes a communication unit 410, a control unit 420, a biological information storage unit 430, the data storage unit 440, a relevant category information storage unit 450 and a facility information storage unit 460. The control unit 420 includes a user condition analysis unit 421, a category switching unit 422, a provided information extraction unit 423, a provision timing determination unit 424 and a relevant category information update unit 425.

Here, hardware included in the information providing server 400 will be explained.

Figure 7:
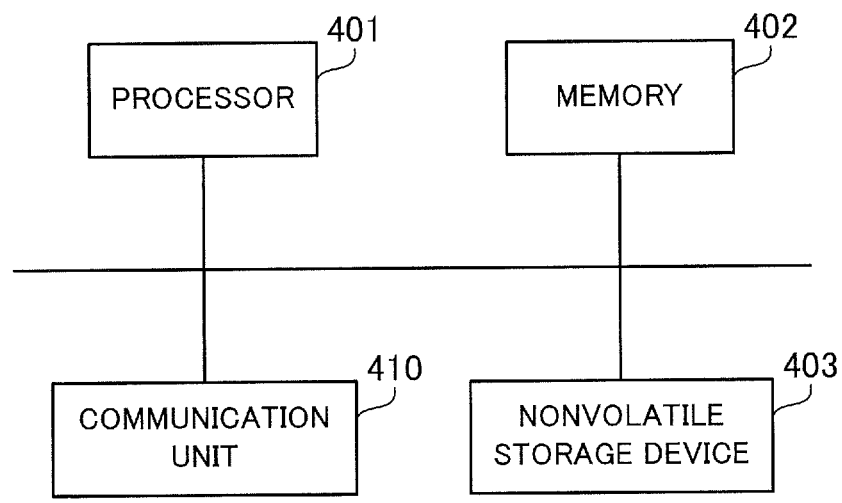
FIG. 7 is a diagram showing hardware included in an information providing server.

FIG. 7 is a diagram showing the hardware included in the information providing server. The information providing server 400 includes a processor 401, a memory 402 and a nonvolatile storage device 403.

Part or all of the communication unit 410 and the control unit 420 may be implemented by the processor 401. Part or all of the communication unit 410 and the control unit 420 may be implemented as a module of a program executed by the processor 401. The program executed by the processor 401 is referred to also as an information providing program. The control unit 420 may also be implemented based on the processor 401 and part of the memory 402.

The biological information storage unit 430, the data storage unit 440, the relevant category information storage unit 450 and the facility information storage unit 460 may also be implemented as storage areas reserved in the memory 402 and the nonvolatile storage device 403.

Returning to FIG. 1, the description will be continued.

The communication unit 410 communicates with the mobile information terminal 300. The communication unit 410 receives the user ID and the transmission data, the user ID and the biological information, or the user ID and the switching request from the mobile information terminal 300. The communication unit 410 transmits the received information to the control unit 420.

The control unit 420 analyzes the user condition based on the biological information. The control unit 420 judges whether the content should be provided or not based on the result of the analysis. The control unit 420 provides the content when it is judged that the content should be provided.

A process executed by the control unit 420 will be described in detail below with reference to components like the user condition analysis unit 421.

When the user ID and the biological information are acquired, the user condition analysis unit 421 analyzes the condition of the user based on the biological information. Specifically, the user condition analysis unit 421 analyzes psychological condition and physical condition of the user based on the biological information. Here, the user can be represented also as a biological object.

Next, the analysis of the psychological condition and the physical condition of the user performed by the user condition analysis unit 421 will be described below.

Figure 8:
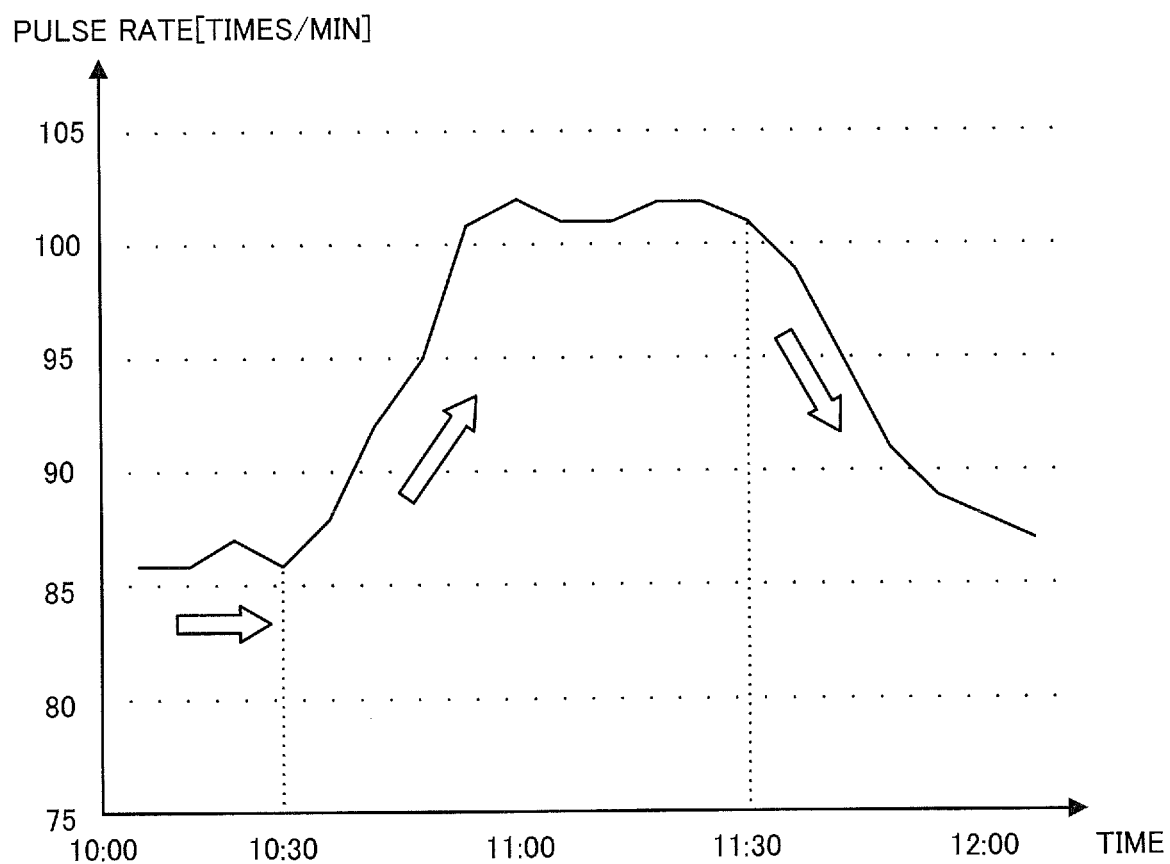
FIG. 8 is a diagram showing an example of a graph based on biological information.

FIG. 8 is a diagram showing an example of a graph based on the biological information. The vertical axis of the graph represents the pulse rate as an item of the biological information. The horizontal axis of the graph represents time. The user condition analysis unit 421 is capable of generating the graph of FIG. 8 based on the biological information acquired by the biological information acquisition unit 210.

The graph indicates that the pulse rate increases after 10:30. Further, the graph indicates that the pulse rate decreases after 11:30.

The user condition analysis unit 421 calculates increase and decrease information based on the amount of change in the biological information. For example, the user condition analysis unit 421 calculates that the increase and decrease information before 10:30 is "constant". The user condition analysis unit 421 calculates that the increase and decrease information after 10:30 is "increase". The user condition analysis unit 421 calculates that the increase and decrease information after 11:30 is "decrease".

FIG. 9 is a diagram showing a user condition judgment table. The user condition judgment table 431 is stored in the biological information storage unit 430. The user condition judgment table 431 has items of increase and decrease information, biological information and user condition.

The item of increase and decrease information indicates the increase and decrease information calculated by the user condition analysis unit 421. The item of biological information indicates the biological information. In FIG. 9, the pulse rate and the acceleration are shown as examples of the biological information. Incidentally, the user condition analysis unit 421 calculates moving speed by integrating the acceleration and calculates the increase and decrease information based on the moving speed. Therefore, the column of the acceleration can be represented also as the moving speed. The item of user condition indicates a user condition name.

The user condition analysis unit 421 is capable of analyzing the user condition based on the increase and decrease information and the biological information by referring to the user condition judgment table 431.

For example, when the pulse rate and the acceleration are constant, the user condition analysis unit 421 determines through analysis that the user condition is "normal". When the pulse rate is increasing, the user condition analysis unit 421 determines through analysis that the user condition is "tension". When the pulse rate and the acceleration are increasing, the user condition analysis unit 421 determines through analysis that the user condition is "impatience". Incidentally, when the pulse rate and the acceleration are increasing, the user is in a condition of moving in a hurry, for example. Therefore, the user condition turns out to be "impatience". When the acceleration is decreasing, the user condition analysis unit 421 determines through analysis that the user condition is "fatigue". Incidentally, when the acceleration of the user is decreasing, the user is in a condition of being tired from walking, for example. Therefore, the user condition turns out to be "fatigue".

FIG. 10 is a diagram showing a user condition information table. The user condition information table 432 is stored in the biological information storage unit 430. The user condition information table 432 has items of user condition and user condition information. The item of user condition indicates the user condition name. The item of user condition information indicates an identifier (e.g., numerical value) capable of specifying the user condition.

The user condition information table 432 indicates correspondence relationship between the user condition and the user condition information. For example, when the user condition is "normal", the user condition information is "0". When the user condition is "fatigue", the user condition information is "1".

The user condition analysis unit 421 acquires the user condition information corresponding to the detected user condition by referring to the user condition information table 432. Here, the user condition information is represented by a numerical value as shown in FIG. 10. However, in the following description, the user condition information will be represented by the corresponding "user condition name" in order to facilitate the understanding.

Here, the user condition analysis unit 421 may also analyze the user condition without calculating the increase and decrease information. For example, the user condition analysis unit 421 analyzes the user condition by using the biological information and a threshold value. Specifically, the user condition analysis unit 421 determines through analysis that the user is "tense" when the pulse rate is higher than or equal to the threshold value.

As above, the user condition analysis unit 421 analyzes the user condition. The analyzed user condition (i.e., the user condition information) will be referred to also as an analysis result.

Returning to FIG. 1, the category switching unit 422 will be described.

When the user ID and the transmission data are acquired, the category switching unit 422 registers information such as the acquired information in a management table which will be described below.

Next, the management table will be described below.

FIG. 11 is a diagram showing the management table. The management table 443 is stored in the data storage unit 440. The management table 443 has items of acquisition time, user ID, position information and category information.

The item of acquisition time indicates a time. The time is registered in the item of acquisition time in a format of "year (e.g., last two digits of the year of the Christian Era)/month/day, hour:minute". For example, in the item of acquisition time, the time when the communication unit 410 acquired the user ID and the transmission data is registered. The time is acquired based on a clock installed in the information providing server 400. In a case where time information is included in the transmission data, the category switching unit 422 may register the time information in the item of acquisition time.

The item of user ID indicates the user ID. The category switching unit 422 registers the user ID acquired from the communication unit 410 in the item of user ID. The item of position information indicates information for identifying each store. The category switching unit 422 registers the position information included in the transmission data acquired from the communication unit 410 in the item of position information. The item of category information indicates the category to which the merchandise or service provided by the store belongs. The category switching unit 422 registers the category information included in the transmission data acquired from the communication unit 410 in the item of category information.

There are cases where the category switching unit 422 acquires the user ID and the switching request. When the user ID and the switching request are acquired, the category switching unit 422 acquires the latest position information and category information corresponding to the user ID from the management table 443. The category switching unit 422 acquires relevant category information corresponding to the category information from a relevant category information table which will be described below.

Next, the relevant category information table will be described below.

FIG. 12 is a diagram showing the relevant category information table. The relevant category information table 451 is stored in the relevant category information storage unit 450. The relevant category information table 451 has items of category information and relevant category information.

The item of category information indicates the category to which the merchandise or service provided by the store belongs. The item of relevant category information indicates category information relevant to the category information. The relevant category information can be referred to also as a category having a high degree of relevance to the category indicated by the category information. For example, the relevant category information on the category information "fashion" is "goods". This means that the degree of relevance between "fashion" and "goods" is high.

As above, the relevant category information table 451 indicates correspondence relationship between the category information and the relevant category information.

Further, the category information and the relevant category information may be associated with each other based on positional relationship between stores (e.g., adjoining or facing, as an example of being at very close positions) or ratio of stores (e.g., the number of adjoining or facing stores in regard to each category).

For example, stores whose category information is "fashion" are the store A, the store B and the store E. The store E adjoins the store F whose category information is "goods". The store B adjoins the store C whose category information is "goods" and faces the store F whose category information is "goods". As above, stores whose category information is "fashion" are situated to adjoin or face a store whose category information is "goods". Namely, stores whose category information is "fashion" are situated at positions very close to a store whose category information is "goods". Accordingly, the relevant category information on the category information "fashion" turns out to be "goods".

Further, for example, stores whose category information is "food" are the store D and the store H. The store D adjoins the store C whose category information is "goods". The store H adjoins the store G whose category information is "service". There are two stores whose category information is "goods": the store C and the store F. There is one store whose category information is "service": the store G. The number of stores whose category information is "goods" is greater than the number of stores whose category information is "service". Accordingly, the relevant category information on the category information "food" turns out to be "goods".

As above, the category information and the relevant category information may be associated with each other based on the positional relationship between stores or the ratio of stores. However, the category information and the relevant category information may be associated with each other according to a different rule as long as the association is made according to a certain rule.

Further, the relevant category information table 451 may be made for each floor of the commercial facility. Then, a relevant category information table for the floor corresponding to the present position of the user carrying the mobile information terminal 300 is used.

Furthermore, the relevant category information table 451 may be made for each user ID. Then, the category switching unit 422 acquires the relevant category information by using a relevant category information table corresponding to the user ID acquired together with the switching request.

As above, when the user ID and the switching request are acquired, the category switching unit 422 acquires the latest position information and category information corresponding to the user ID from the management table 443. The category switching unit 422 refers to the relevant category information table 451 and thereby acquires the relevant category information corresponding to the category information. The category switching unit 422 transmits the latest position information and the relevant category information to the provided information extraction unit 423.

Returning to FIG. 1, the provided information extraction unit 423 will be described.

The provided information extraction unit 423 extracts content from a facility information table which will be described below.

Next, the facility information table will be described below.

FIG. 13 is a diagram showing the facility information table. The facility information table 461 is stored in the facility information storage unit 460. The facility information table 461 has items of position information, category information, content, provision item information and event information.

The item of position information indicates information for identifying each store. The item of category information indicates the category to which the merchandise or service provided by the store belongs.

The item of provision item information indicates a characteristic of the store. For example, the characteristic of the store indicates a characteristic of the merchandise or service provided by the store by using a numerical value. For example, the store A is assumed to provide clothes, shoes and bags. The provision item information indicating clothes is assumed to be "1". The provision item information indicating bags is assumed to be "2". The provision item information indicating shoes is assumed to be "3". The provision item information on the store A is 6 (1+2+3). The provision item information on a store providing service only or a store providing both merchandise and service is calculated in a similar manner. This method of determining the provision item information is just an example. Thus, the method of determining the provision item information can be a different method as long as the method has certain regularity. It is also possible to determine the numerical values corresponding to the provision item information based on the type, size or capacity of the merchandise, an age range or gender as the target of sales, an age range or gender as the target of selling the service, or the like.

The item of event information indicates the event information. For example, the event information includes a starting time and an ending time of an event. As above, the facility information table 461 indicates correspondence relationship between the time period of an event held by a store and the category information indicating the category to which the merchandise or service provided by the store holding the event belongs. Here, the category to which the merchandise or service provided by the store holding the event belongs will be referred to also as first category information.

Incidentally, a manager of the commercial facility or a manager of a store is capable of updating the content and event information registered in the facility information table 461 by using a mobile terminal or the like.

The provided information extraction unit 423 extracts content from the facility information table 461 based on the position information and the category information registered in the management table 443 by the category switching unit 422. Specifically, the provided information extraction unit 423 extracts content with which the same category information as the category information included in the transmission data has been associated and with which position information (i.e., store) different from the position information (i.e., store) included in the transmission data has been associated. For example, in a case where the category switching unit 422 has registered the position information "store C" and the category information "goods" in the management table 443, the provided information extraction unit 423 extracts the content of the "store F" belonging to the same category as the "store C".

Further, in a case where the category switching unit 422 has registered the position information "store B" and the category information "fashion" in the management table 443, for example, the provided information extraction unit 423 detects the "store A" or the "store E" belonging to the same category as the "store B". Here, the provided information extraction unit 423 that has detected a plurality of stores may select one store from the plurality of stores and extract the content of the selected store from the facility information table 461. Alternatively, the provided information extraction unit 423 that has detected a plurality of stores may select one store from the plurality of stores based on the provision item information indicating the characteristic of each of the plurality of stores and extract the content of the selected store from the facility information table 461. For example, the provided information extraction unit 423 compares the provision item information on the store B with the provision item information on the store A and the provision item information on the store E. The provided information extraction unit 423 extracts the content of a store having the same numerical value as the provision item information on the store B or a store whose difference as the result of the comparison is smaller from the facility information table 461. Specifically, the provided information extraction unit 423 calculates the difference between the provision item information "6" on the store B and the provision item information "2" on the store E (namely, 4). The provided information extraction unit 423 calculates the difference between the provision item information "6" on the store B and the provision item information "6" on the store A (namely, 0). The provided information extraction unit 423 extracts the content of the store A from the facility information table 461.

Further, when the latest position information and the relevant category information are acquired, the provided information extraction unit 423 extracts content from the facility information table 461. For example, when the position information "store B" and the relevant category information "goods" are acquired, the provided information extraction unit 423 extracts content of a store belonging to the same category as the relevant category information "goods" from the facility information table 461. For example, the provided information extraction unit 423 extracts the content of the store C belonging to the same category as the relevant category information "goods".

When there exist a plurality of stores in the same category as the relevant category information, the provided information extraction unit 423 may select one store by comparing the provision item information regarding the latest position information (e.g., the store B) with the provision item information on each of the plurality of stores as above. Further, the provided information extraction unit 423 may also extract the content by searching for category information downward in the facility information table 461 from the first stage of the facility information table 461.

After extracting the content, the provided information extraction unit 423 acquires a judgment result from the provision timing determination unit 424 as will be described later. The judgment result indicates whether or not it's the right timing for providing the content.

When the judgment result indicates that it's the right timing for providing the content, the provided information extraction unit 423 transmits the content to the communication unit 410. Then, the communication unit 410 transmits the content to the mobile information terminal 300. As above, the information providing server 400 provides content to the mobile information terminal 300 when it is judged that the content should be provided to the mobile information terminal 300.

When the judgment result indicates that it's not the right timing for providing the content, the provided information extraction unit 423 retains the content until a judgment result indicating that it's the right timing for providing the content is acquired from the provision timing determination unit 424. Further, the provided information extraction unit 423 retains the content until the user ID and new transmission data or the user ID and the switching request are acquired from the communication unit 410.

Next, returning to FIG. 1, the provision timing determination unit 424 will be described below.

The provision timing determination unit 424 acquires the user condition information from the user condition analysis unit 421. The provision timing determination unit 424 judges whether the content should be provided to the mobile information terminal 300 or not based on the user condition information (i.e., the analysis result). The provision timing determination unit 424 transmits the judgment result to the provided information extraction unit 423.

The judgment made by the provision timing determination unit 424 will be described in detail below. The provision timing determination unit 424 makes the judgment based on a certain condition.

For example, when the user condition information "impatience", "tension" or "fatigue" is continuously acquired from the user condition analysis unit 421 for a fixed period, the provision timing determination unit 424 judges that it's not the right timing for providing the content. When the user condition information is "impatience", "tension" or "fatigue", the user is in a condition of moving in a hurry to an area as a destination, for example. Thus, even if the information providing server 400 transmits the content to the mobile information terminal 300, the probability that the user watches the content is low. Therefore, in such case, the provision timing determination unit 424 judges that it's not the right timing for providing the content. Further, even if "impatience", "tension" or "fatigue" is not acquired continuously for the fixed period, the provision timing determination unit 424 may judge that it's not the right timing for providing the content when "impatience", "tension" or "fatigue" is acquired.

When the user condition information "normal" is acquired from the user condition analysis unit 421, for example, the provision timing determination unit 424 judges that it's the right timing for providing the content. When the user condition information is "normal", the user is in a condition of being capable of watching the content. Thus, in such case, the provision timing determination unit 424 judges that it's the right timing for providing the content.

An example of the condition of the right timing for providing the content has been described above. However, the condition of the right timing for providing the content can be arbitrarily changed based on the user condition information.

Next, the relevant category information update unit 425 will be described below.

The relevant category information update unit 425 updates the relevant category information table 451. For example, the relevant category information update unit 425 periodically updates the relevant category information table 451. The cycle of the update is one hour, for example. The cycle is alterable.

Details will be explained. From the starting time to the ending time of an event indicated by the event information in the facility information table 461, the relevant category information update unit 425 updates the relevant category information in the relevant category information table 451 to the category information to which the store holding the event belongs.

A concrete example will be explained below.

The facility information table 461 indicates that the store H whose category information is "food" holds an event from 11 o'clock to 12 o'clock. When it reaches 11 o'clock, the relevant category information update unit 425 acquires the category information "food" on the store H. The relevant category information update unit 425 updates the relevant category information corresponding to the category information "fashion", "goods" and "service" in the relevant category information table 451 to the acquired category information "food".

When the event of the store H ends (i.e., when it reaches 12 o'clock), the relevant category information update unit 425 returns the relevant category information tables 451 corresponding to all user IDs to the state before the update.

Further, when the communication unit 410 acquires the switching request more than once during the event period of the store H, the relevant category information update unit 425 returns the relevant category information table 451 corresponding to the user ID of the mobile information terminal 300 transmitting the switching request more than once to the state before the update. This means that the user carrying the mobile information terminal 300 acquires a coupon issued by the store H once and thereafter requests to acquire content corresponding to category information other than "food", during the time period in which the event is held by the store H.

Furthermore, the relevant category information update unit 425 updates the relevant category information table 451 when the user condition information is "normal" or "fatigue". Details will be explained. When the user condition information is "normal", the relevant category information update unit 425 updates the relevant category information table 451 according to an event that has been set to the facility information table 461.

When the user condition information is "fatigue", the relevant category information update unit 425 determines through analysis that it is desirable to let the user take a rest. Then, the relevant category information update unit 425 acquires the category information on a store where the user can take a rest. The relevant category information update unit 425 updates the relevant category information in the relevant category information table 451 to the acquired category information. Incidentally, the category information on the store where it is possible to take a rest is "food", for example. However, the category information on the store where it is possible to take a rest can differ from "food" as long as the area has a resting space or the like.

As above, the provided information extraction unit 423 extracts content from the facility information table 461. In a time period in which an event is held, the provided information extraction unit 423 can extract content of the store to which the event information has been set. For example, from 11 o'clock to 12 o'clock, the provided information extraction unit 423 can extract the coupon of the store H holding the event.

Here, as mentioned earlier, the category switching unit 422 acquires the relevant category information from the relevant category information table 451. However, when the relevant category information table 451 is in the middle of update, the category switching unit 422 cannot acquire the relevant category information until the update of the relevant category information table 451 ends.

Further, when the communication unit 410 acquires a new user ID, the relevant category information update unit 425 generates a relevant category information table corresponding to the new user ID.

Next, the operation of each device will be described below.

(Operation of Wireless Transmission Device 100)

First, the transmission unit 110 of the wireless transmission device 100 installed in each of the plurality of stores in the commercial facility transmits the transmission data including the position information and the category information. For example, the transmission unit 110 transmits the transmission data every 100 ms. Incidentally, the radio wave intensity has been set so that the mobile information terminal 300 can receive the transmission data in the store in which the wireless transmission device 100 is installed. Further, the radio wave intensity is set so that the mobile information terminal 300 cannot receive the transmission data outside the store. For example, the radio wave intensity is set so that the transmission data transmitted by the wireless transmission device 100a can be received by the mobile information terminal 300 in the store A. The radio wave intensity is set so that the transmission data transmitted by the wireless transmission device 100a cannot be received by the mobile information terminal 300 outside the store A.

(Operation of Biological Information Acquisition Device 200)

The biological information acquisition unit 210 of the biological information acquisition device 200 acquires the biological information at constant periods. The biological information transmission unit 220 transmits the biological information to the mobile information terminal 300.

(Operation of Mobile Information Terminal 300)

The operation of the mobile information terminal 300 will be described below by using a flowchart.

Figure 14:
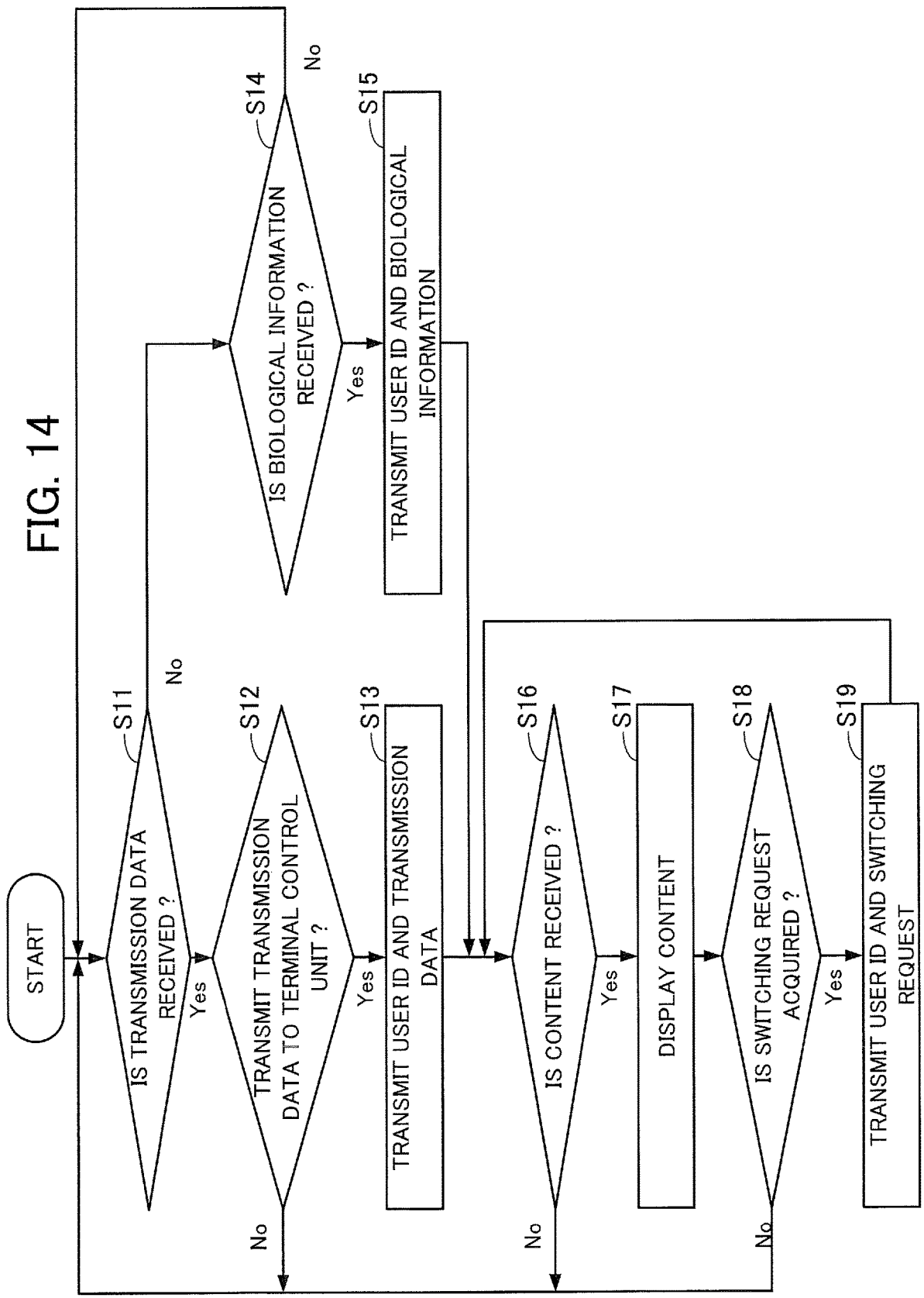
FIG. 14 is a flowchart showing a process executed by the mobile information terminal.

FIG. 14 is a flowchart showing a process executed by the mobile information terminal.

(Step S11) The terminal reception unit 310 judges whether or not the transmission data is received. When the transmission data is received (Yes in step S11), the terminal reception unit 310 advances the process to step S12. When information other than the transmission data is received (No in the step S11), the terminal reception unit 310 advances the process to step S14.

(Step S12) The terminal reception unit 310 judges whether or not the transmission data should be transmitted to the terminal control unit 320. The terminal reception unit 310 judges that the transmission data should not be transmitted to the terminal control unit 320 when the received transmission data is the same as transmission data received last time or the reception radio wave intensity at the time of acquiring the transmission data is less than or equal to a reference value. The terminal reception unit 310 judges that the transmission data should be transmitted to the terminal control unit 320 when the received transmission data is not the same as the transmission data received last time and the reception radio wave intensity at the time of acquiring the transmission data is higher than the reference value. Incidentally, the transmission data received last time may be represented also as transmission data received most recently.

When it is judged that the transmission data should be transmitted to the terminal control unit 320 (Yes in the step S12), the terminal reception unit 310 advances the process to step S13. When it is judged that the transmission data should not be transmitted to the terminal control unit 320 (No in the step S12), the terminal reception unit 310 advances the process to the step S11.

Incidentally, the judgment processing of the steps S11 and S12 may be executed by the terminal control unit 320.

(Step S13) The terminal control unit 320 transmits the user ID and the transmission data to the information providing server 400 via the terminal communication unit 330. Then, the terminal control unit 320 advances the process to step S16.

Incidentally, the mobile information terminal 300 is assumed to have previously acquired the user ID from a server managing the user ID in the commercial facility or outside the commercial facility.

(Step S14) The terminal reception unit 310 judges whether or not the biological information is received. When the biological information is received (Yes in the step S14), the terminal reception unit 310 advances the process to step S15. When the biological information is not received (No in the step S14), the terminal reception unit 310 advances the process to the step S11.

(Step S15) The terminal reception unit 310 transmits the biological information to the terminal control unit 320. Then, the terminal control unit 320 transmits the user ID and the biological information to the information providing server 400 via the terminal communication unit 330.

Incidentally, the mobile information terminal 300 is assumed to have previously acquired the user ID from a server managing the user ID in the commercial facility or outside the commercial facility.

(Step S16) The terminal control unit 320 judges whether or not content is received from the information providing server 400 via the terminal communication unit 330.

Here, the case where content is received is a case where the terminal control unit 320 receives content from the information providing server 400 based on the user ID and the transmission data. Alternatively, the case where content is received is a case where the terminal control unit 320 receives content from the information providing server 400 based on the user ID and the switching request.

When content is received (Yes in the step S16), the terminal control unit 320 advances the process to step S17. When content is not received (No in the step S16), the terminal control unit 320 advances the process to the step S11.

Incidentally, there are cases where the terminal control unit 320 cannot immediately receive content from the information providing server 400 depending on the condition of the user.

(Step S17) The terminal control unit 320 transmits the content to the terminal display unit 350. Then, the terminal display unit 350 displays the content.

(Step S18) The terminal control unit 320 judges whether or not the switching request is acquired from the terminal input unit 340. Incidentally, the switching request is detected by the terminal input unit 340 when the CHANGE button 351 is depressed by the user. When the switching request is detected, the terminal input unit 340 transmits the switching request to the terminal control unit 320.

When the switching request is acquired (Yes in the step S18), the terminal control unit 320 advances the process to step S19. When the switching request is not acquired (No in the step S18), the terminal control unit 320 advances the process to the step S11.

(Step S19) The terminal control unit 320 transmits the user ID and the switching request to the information providing server 400 via the terminal communication unit 330.

Accordingly, the mobile information terminal 300 can receive content corresponding to the relevant category information relevant to the category information included in the transmission data from the information providing server 400.

Then, the terminal control unit 320 advances the process to the step S16.

(Operation of Information Providing Server 400)

The operation of the information providing server 400 will be described below by using a flowchart.

FIG. 15 is a flowchart showing a content transmission process. Incidentally, it is assumed that the process of FIG. 15 is executed for the same user ID.

(Step S21) The communication unit 410 receives the user ID and the transmission data, the user ID and the biological information, or the user ID and the switching request from the mobile information terminal 300. The communication unit 410 transmits the received information to the control unit 420.

(Step S22) The user condition analysis unit 421 judges whether or not the user ID and the biological information are acquired. When the user ID and the biological information are acquired (Yes in step S22), the user condition analysis unit 421 advances the process to step S23. When the user ID and the biological information are not acquired (No in the step S22), the user condition analysis unit 421 advances the process to step S25.

(Step S23) The user condition analysis unit 421 calculates the amount of change based on the biological information acquired by the communication unit 410 in the step S21 and other biological information already acquired by a time predetermined time earlier than the time the communication unit 410 acquired the aforementioned biological information. The user condition analysis unit 421 calculates the increase and decrease information based on the amount of change.

The user condition analysis unit 421 analyzes the user condition corresponding to the increase and decrease information based on the user condition judgment table 431.

The user condition analysis unit 421 refers to the user condition information table 432 and thereby acquires the user condition information corresponding to the user condition. The user condition analysis unit 421 associates the user ID with the user condition information.

(Step S24) The user condition analysis unit 421 judges whether content for the same user ID as that associated with the user condition information has been retained or not.

When the content has been retained (Yes in step S24), the process is advanced to step S30. When the content has not been retained (No in the step S24), the user condition analysis unit 421 ends the process.

(Step S25) The category switching unit 422 judges whether or not the user ID and the switching request are acquired. When the user ID and the switching request are acquired (Yes in the step S25), the category switching unit 422 advances the process to step S27. When the user ID and the transmission data are acquired (No in the step S25), the category switching unit 422 advances the process to step S26.

(Step S26) The category switching unit 422 registers acquisition time of the transmission data, the user ID, position information and category information in the management table 443. Then, the category switching unit 422 advances the process to step S29.

(Step S27) The category switching unit 422 acquires the latest position information and the latest category information corresponding to the user ID acquired together with the switching request from the management table 443. For example, when the category switching unit 422 acquires the switching request and a user ID "U01" and the time of acquiring the switching request is "2018/03/19, 14:25", the category switching unit 422 acquires the position information "store D" and the category information "food" from the management table 443.

(Step S28) The category switching unit 422 acquires the relevant category information corresponding to the category information acquired in the step S27 from the relevant category information table 451. For example, the category switching unit 422 acquires the relevant category information "goods" corresponding to the category information "food" from the relevant category information table 451.

(Step S29) When the step S29 is executed after the step S26, the provided information extraction unit 423 extracts content from the facility information table 461 based on the category information included in the transmission data.

When the step S29 is executed after the step S28, the provided information extraction unit 423 extracts content from the facility information table 461 based on the relevant category information acquired in the step S28.

(Step S30) The provision timing determination unit 424 judges whether it's the right timing for providing the content or not based on the user condition information.

Details will be explained. When the step S30 is executed after the steps S26 and S29, the provision timing determination unit 424 acquires the user condition information corresponding to the user ID transmitted together with the transmission data from the user condition analysis unit 421. The provision timing determination unit 424 judges whether it's the right timing for providing the content or not based on the user condition information.

When the step S30 is executed after the steps S28 and S29, the provision timing determination unit 424 acquires the user condition information corresponding to the user ID transmitted together with the switching request from the user condition analysis unit 421. The provision timing determination unit 424 judges whether it's the right timing for providing the content or not based on the user condition information. Incidentally, the provision timing determination unit 424 may always judge that the judgment is the right timing for providing the content.

When the step S30 is executed after the step S24, the provision timing determination unit 424 acquires the user ID and the user condition information from the user condition analysis unit 421. The provision timing determination unit 424 judges whether it's the right timing for providing the content or not based on the user condition information on the user ID associated with the retained content.

The provision timing determination unit 424 transmits the judgment result to the provided information extraction unit 423.

The provided information extraction unit 423 judges whether it's the right timing for providing the content or not based on the judgment result. When it's the right timing for providing the content (Yes in the step S30), the provided information extraction unit 423 advances the process to step S31. When it's not the right timing for providing the content (No in the step S30), the provided information extraction unit 423 advances the process to step S32.

(Step S31) The provided information extraction unit 423 transmits the content to the mobile information terminal 300 via the communication unit 410.

(Step S32) The provided information extraction unit 423 retains the content while associating the content with the user ID. As above, the information providing server 400 retains the content when judging that the content should not be provided. Thus, the information providing server 400 is capable of withholding the provision of the content when the user does not need the content.

Next, a concrete example of a case where content is provided to the mobile information terminal 300 will be described below.

FIGS. 16(*a*) to 16(*f*) are diagrams showing an example of screen transition of the mobile information terminal 300 due to movement of the user and an operation by the user.

FIG. 16(*a*) shows a state when the user 30 carrying the mobile information terminal 300 is in the store A. The mobile information terminal 300 receives the transmission data from the wireless transmission device 100*a*. The mobile information terminal 300 transmits the user ID and the transmission data to the information providing server 400 (step S13). Here, the user condition information on the user 30 is "normal".

The information providing server 400 judges that it's the right timing for providing the content (Yes in the step S30) since the user condition information on the user 30 is "normal". The information providing server 400 transmits the content to the mobile information terminal 300 (step S31).

Figure 16A:
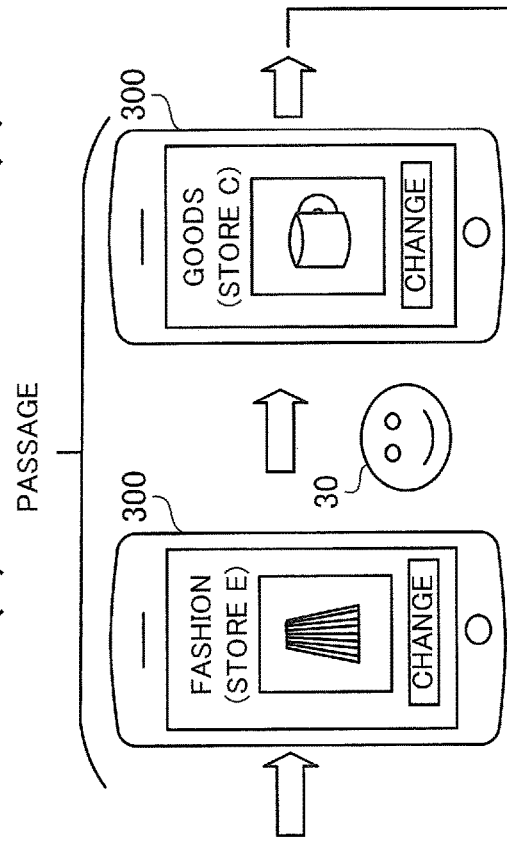
FIGS. 16(*a*) to 16(*f*) are diagrams showing an example of screen transition of the mobile information terminal due to movement of the user and an operation by the user.
Figure 16B:
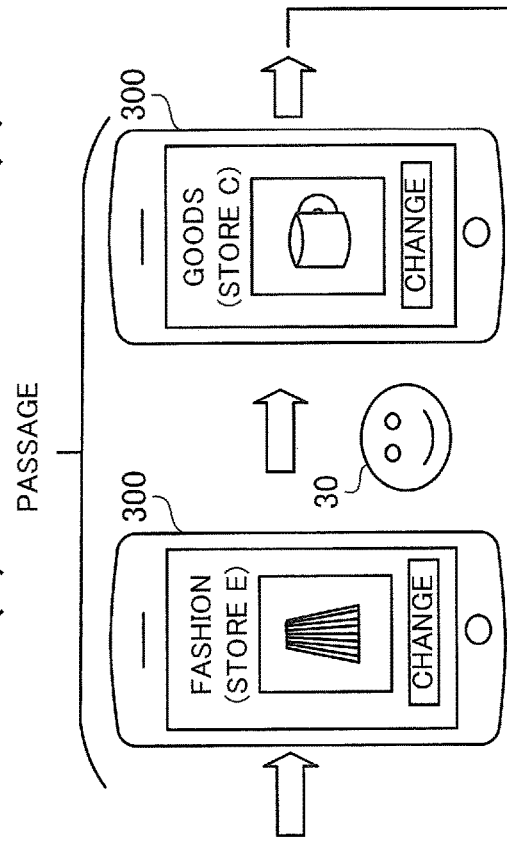

FIG. 16(b) shows a state in which the content of the store E belonging to the same category as the store A is displayed on the mobile information terminal 300.

The user 30 exits the store A. Namely, the user 30 is situated in a passage.

Figure 16C:
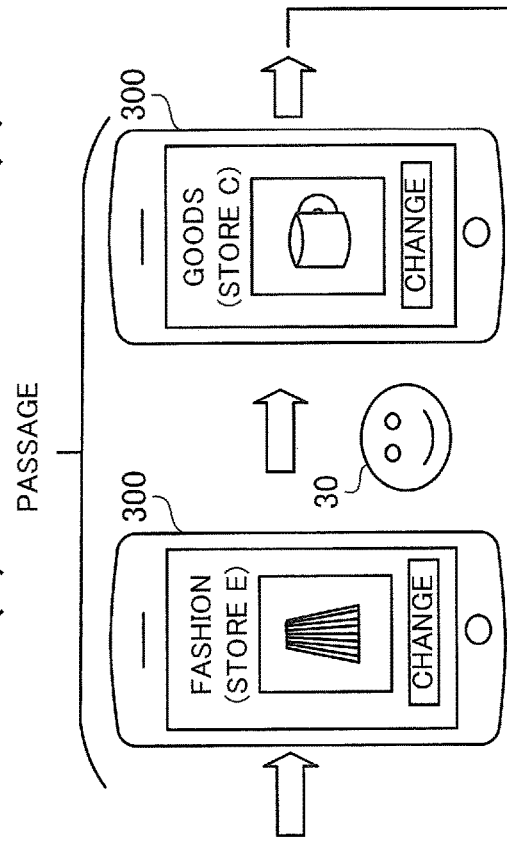

FIG. 16(c) shows a state in which the content of the store E is displayed on the mobile information terminal 300 carried by the user 30 in the passage. The user 30 depresses the CHANGE button 351. The mobile information terminal 300 transmits the user ID and the switching request to the information providing server 400 (step S19).

The information providing server 400 transmits the content of the store C belonging to the category "goods" as the category relevant to the category "fashion" of the store E to the mobile information terminal 300 (step S31).

Figure 16D:
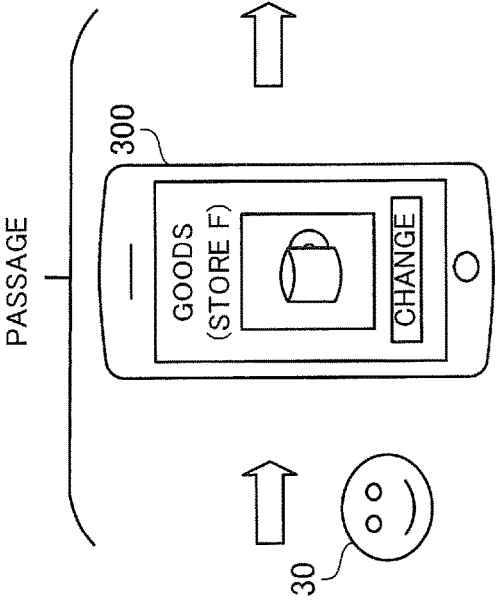

FIG. 16(d) shows a state in which the content of the store C is displayed on the mobile information terminal 300.

Here, the user condition information on the user 30 is assumed to have changed from "normal" to "impatience". The user 30 enters the store C.

The mobile information terminal 300 receives the transmission data from the wireless transmission device 100c. The mobile information terminal 300 transmits the user ID and the transmission data to the information providing server 400 (step S13).

The information providing server 400 extracts the content of the store F (step S29). The information providing server 400 judges that it's not the right timing for providing the content (No in the step S30) since the user condition information on the user 30 is "impatience". The information providing server 400 retains the content of the store F (step S32).

Figure 16E:
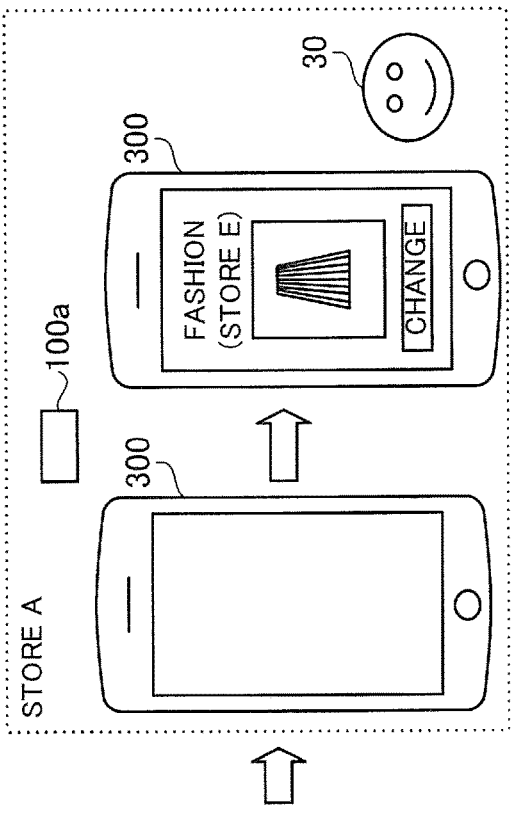

FIG. 16(e) shows a state in which nothing is displayed on the mobile information terminal 300.

Here, the user condition information on the user 30 is assumed to have changed from "impatience" to "normal". Namely, the information providing server 400 acquires the user condition information "normal" on the user 30 (step S23). The information providing server 400 judges that it's the right timing for providing the content (Yes in the step S30) since the user condition information on the user 30 is "normal". The information providing server 400 transmits the retained content of the store F to the mobile information terminal 300 (step S31).

Figure 16F:
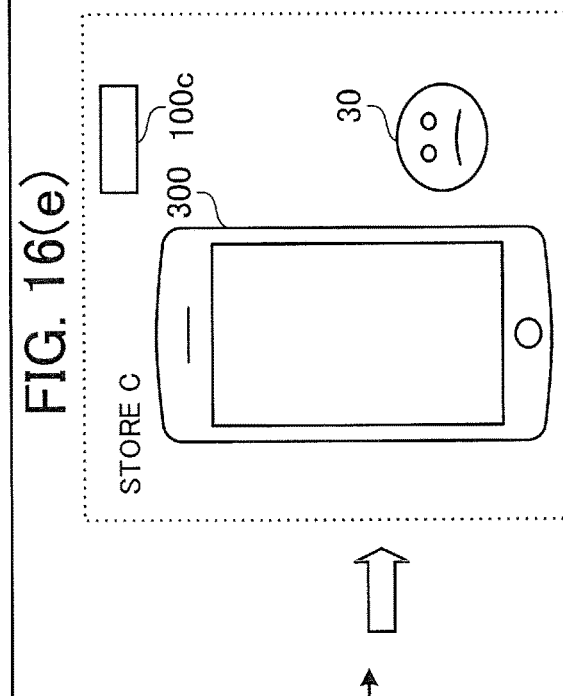

FIG. 16(f) shows a state in which the content of the store F belonging to the same category as the store C is displayed on the mobile information terminal 300.

According to this embodiment, the mobile information terminal 300 is capable of acquiring content based on the relevant category information from the information providing server 400 by transmitting the switching request to the information providing server 400. Further, the mobile information terminal 300 is capable of providing beneficial content to the user.

Furthermore, when the user is situated in the passage, the mobile information terminal 300 is capable of acquiring beneficial content from the information providing server 400 by transmitting the switching request to the information providing server 400.

The information providing server 400 analyzes the condition of the user by receiving the biological information from the mobile information terminal 300. Then, the information providing server 400 is capable of providing content to the user appropriately for the condition of the user and with appropriate timing.

Next, a case where the relevant category information table 451 is updated will be described below by using a flowchart.

Figure 18:
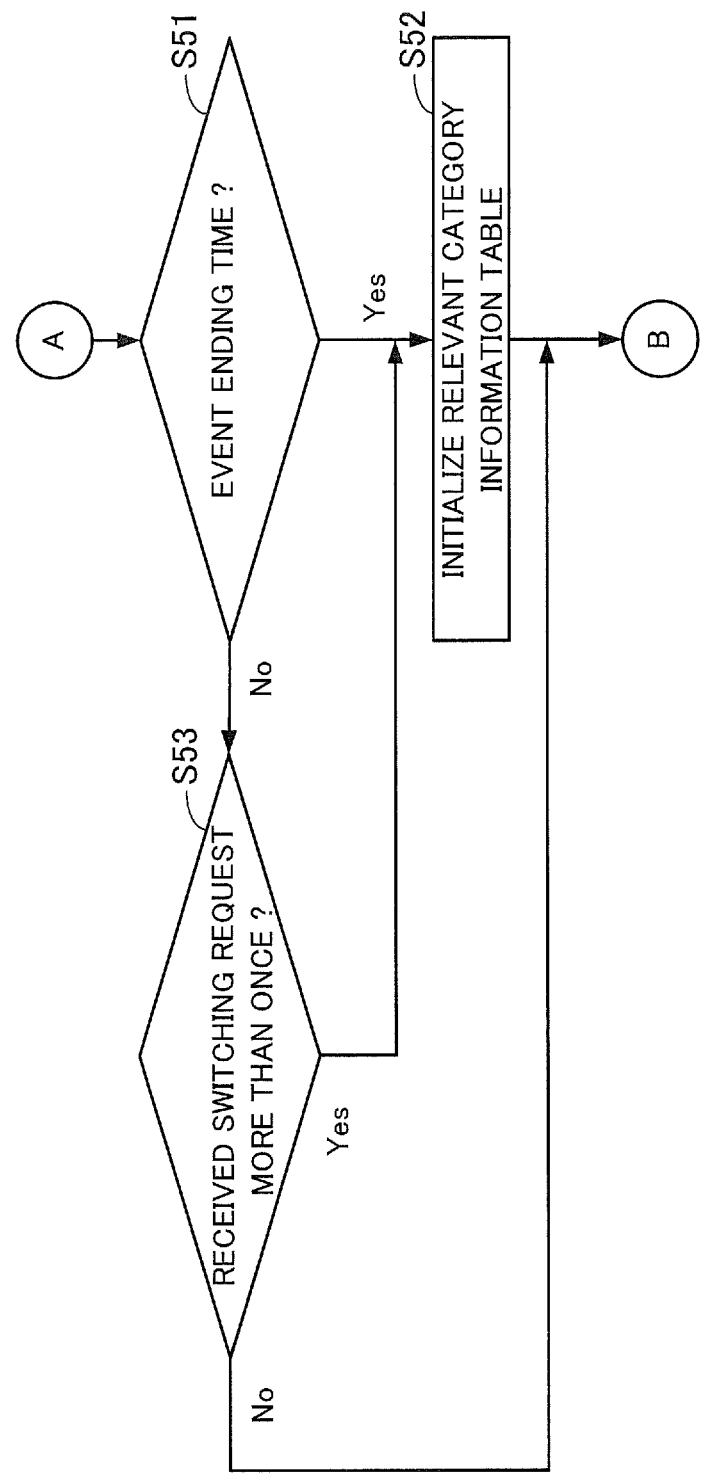
FIG. 18 is a flowchart (part 2) showing update processing of the relevant category information table.

FIG. 17 is a flowchart (part 1) showing update processing of a relevant category information table. Incidentally, the process shown in FIGS. 17 and 18 is executed periodically. For example, the process of FIGS. 17 and 18 is executed at periods of 30 minutes or one hour.

(Step S41) The relevant category information update unit 425 acquires the user condition information from the user condition analysis unit 421. The relevant category information update unit 425 judges whether or not the user condition information is "normal" or "fatigue".

When the user condition information is "normal" or "fatigue" (Yes in step S41), the relevant category information update unit 425 advances the process to step S42. When the user condition information is neither "normal" nor "fatigue" (No in the step S41), the relevant category information update unit 425 ends the process.

(Step S42) The relevant category information update unit 425 judges whether or not the user condition information is "normal". When the user condition information is "normal" (Yes in the step S42), the relevant category information update unit 425 advances the process to step S43. When the user condition information is "fatigue" (No in the step S42), the relevant category information update unit 425 determines through analysis that it is desirable to let the user take a rest. The relevant category information update unit 425 advances the process to step S47.

(Step S43) The relevant category information update unit 425 refers to the facility information table 461 and judges whether or not the present time is in an event time period of any store. When the present time is in the event time period of any store (Yes in the step S43), the relevant category information update unit 425 advances the process to step S44. When the present time is in no event time period (No in the step S43), the relevant category information update unit 425 ends the process.

(Step S44) The relevant category information update unit 425 judges whether or not the present time equals the event starting time of any store. When the present time equals the event starting time of any store (Yes in the step S44), the relevant category information update unit 425 advances the process to step S45. When the present time does not equal the event starting time of any store (No in the step S44), the relevant category information update unit 425 advances the process to step S51.

(Step S45) The relevant category information update unit 425 acquires the category information on the store holding the event from the facility information table 461.

(Step S46) The relevant category information update unit 425 updates the relevant category information in the relevant category information table 451 to the category information acquired in the step S45 or the step S47 which will be described below. Then, the relevant category information update unit 425 ends the process.

(Step S47) The relevant category information update unit 425 acquires the category information on a store where it is possible to take a rest from the facility information table

461. Here, the store where it is possible to take a rest is a store including an area in which the user can take a rest. For example, the store where it is possible to take a rest is a store whose category information is "food". Then, the relevant category information update unit 425 advances the process to the step S46.

FIG. 18 is a flowchart (part 2) showing update processing of the relevant category information table.

(Step S51) The relevant category information update unit 425 judges whether or not the present time is the ending time of the event. When the present time is the ending time of the event (Yes in the step S51), the relevant category information update unit 425 advances the process to step S52. When the present time is not the ending time of the event (No in the step S51), the relevant category information update unit 425 advances the process to step S53.

(Step S52) The relevant category information update unit 425 returns the relevant category information in the relevant category information table 451 to the initial state (e.g., the state shown in FIG. 12). Then, the relevant category information update unit 425 ends the process.

(Step S53) The relevant category information update unit 425 judges whether or not the communication unit 410 has acquired the switching request more than once. When the condition of the step S53 is satisfied (Yes in the step S53), the relevant category information update unit 425 advances the process to the step S52. When the condition of the step S53 is not satisfied (No in the step S53), the relevant category information update unit 425 ends the process.

A concrete example of the update process for the relevant category information table 451 will be described below. In this concrete example, the relevant category information table 451 shown in FIG. 12 and the facility information table 461 shown in FIG. 13 are referred to.

When the present time is 11:00, the event of the store H is started. Therefore, the relevant category information update unit 425 acquires the category information "food" (step S45). The category information "food" may be represented also as the first category information.

The relevant category information update unit 425 updates the relevant category information in the relevant category information table 451 corresponding to the category information "fashion", "goods" and "service" to "food" (step S46).

When the communication unit 410 receives the switching request from the mobile information terminal 300 more than once before the event ending time of the store H (Yes in the step S53), the relevant category information update unit 425 returns the relevant category information in the relevant category information table 451 corresponding to the category information "fashion", "goods" and "service" to the state before the update (e.g., the state shown in FIG. 12) (step S52).

When the event ending time comes, the relevant category information update unit 425 returns the relevant category information in the relevant category information table 451 corresponding to the category information "fashion", "goods" and "service" to the state before the update (e.g., the state shown in FIG. 12) (step S52).

As above, the information providing server 400 is capable of providing the mobile information terminal 300 with information suitable for the status of an event and the condition of the user by reconstructing the relevancy among the stores (i.e., updating or initializing the relevant category information table 451) in real time based on the event information on a plurality of stores and the user condition information.

Further, when the user condition information is "fatigue", the relevant category information update unit 425 does not have to update the relevant category information table 451. In this case, the relevant category information update unit 425 transmits the user condition information being "fatigue" to the provided information extraction unit 423. The provided information extraction unit 423 extracts the content of a store where it is possible to take a rest from the facility information table 461. The provided information extraction unit 423 transmits the content to the mobile information terminal 300 via the communication unit 410. This enables the user in the condition of "fatigue" to recognize a store where it is possible to take a rest. Then, the user can take a rest in the store where it is possible to take a rest.

As above, when the result of the analyzing is that the user needs a rest, the information providing server 400 provides the user with the content of a store including a place to rest. The information providing server 400 is capable of providing the user with beneficial information appropriately for the condition of the user.

The mobile information terminal 300 is capable of acquiring information on a particular store in the facility corresponding to the position of the user based on the transmission data received from the wireless transmission device 100. Further, the mobile information terminal 300 is capable of acquiring information on a particular store in the facility corresponding to the switching request through to a simple operation by the user such as a touching operation.

The wireless transmission device 100 is capable of transmitting the transmission data not via a network or the like constructed in the facility, for example, by limiting the reception range of the transmission data.

Here, the mobile information terminal 300 includes a sensor such as an acceleration sensor. Therefore, the mobile information terminal 300 may acquire a sensor value (i.e., biological information) from the sensor. Then, the mobile information terminal 300 transmits the biological information to the information providing server 400. The information providing server 400 may analyze the user condition based on the biological information transmitted from the mobile information terminal 300. Alternatively, the information providing server 400 may analyze the user condition based on the biological information acquired by the biological information acquisition device 200 and the biological information acquired by the mobile information terminal 300.

In the above description, a case where the information providing server 400 analyzes the user condition have been described. However, it is also possible to make the mobile information terminal 300 analyze the user condition. Details will be explained below. The mobile information terminal 300 analyzes the user condition based on the biological information transmitted from the biological information acquisition device 200. The method used by the mobile information terminal 300 to analyze the user condition is the same as the method used by the user condition analysis unit 421 to analyze the user condition. Therefore, the mobile information terminal 300 may include the user condition judgment table 431 and the user condition information table 432. The mobile information terminal 300 transmits the analysis result (i.e., the user condition information) obtained by analyzing the user condition to the information providing server 400. The information providing server 400 receives the analysis result from the mobile information terminal 300. The information providing server 400 judges whether the content should be provided to the mobile information terminal 300 or not based on the analysis result. When judging that the mobile information terminal 300 should be provided with the content, the information providing server 400 provides the mobile information terminal 300 with the content. Since the mobile information terminal 300 analyzes the user condition as above, the information providing server 400 is relieved of the task of analyzing the user condition. Accordingly, the processing load on the information providing server 400 can be reduced in the information providing system.

What is claimed is:

1. An information providing system for selecting content to be provided to a user and when to provide the selected content based on a condition of the user, the system comprising:
 a terminal device that acquires, from one or more sensors, biological information including an acceleration and pulse rate of the user; and
 an information processing device,
 wherein the terminal device
  calculates an amount of change for each of the pulse rate and acceleration based on currently acquired biological information and previous biological information acquired a predetermined time earlier than the time of the currently acquired biological information,
  calculates increase and decrease information for each of the pulse rate and acceleration based on the calculated amount of change,
  determines a current condition, from a plurality of predefined conditions, of the user based on the calculated increase and decrease information for each of the pulse rate and acceleration, the plurality of predefined conditions including at least a normal condition and one or more non-normal conditions, the non-normal conditions being one or more of tension, impatience, and fatigue, and
 the information processing device
  receives transmission data including position information as information for identifying a store and category information indicating a category to which merchandise or service provided by the store belongs,
  selects, as the content to be provided to the user, content of another store associated with the category information and different from the store identified by the position information included in the transmission data when judging that the content of the another store should be provided,
  receives the determined current condition of the user from the terminal device,
  judges whether the selected content should be provided to the terminal device or not based on whether the received current condition has been continuously been a non-normal condition for a fixed period of time, and
  transmits the selected content to the terminal device when judging that the content should be provided to the terminal device.

2. The information providing system according to claim 1, wherein the information processing device retains the content when judging that the content should not be provided.

3. The information providing system according to claim 1, wherein the information processing device
 when a plurality of other stores including the another store associated with the category information and different from the store identified by the position information are detected, selects one store from the plurality of detected other stores based on provision item information indicating a characteristic of the plurality of detected other stores, and
 selects, as the content to be provided to the user, content of the selected store when judging that the content of the selected store should be provided.

4. The information providing system according to claim 1, wherein the terminal device includes a mobile information terminal used by the user and a biological information acquisition device, wherein
 the biological information acquisition device
  acquires the biological information from the one or more sensors, and
  transmits the biological information to the mobile information terminal,
 the mobile information terminal
  receives the biological information from the biological information acquisition device, and
  determines the current condition, from the plurality of predefined conditions, of the user based on the calculated increase and decrease information and transmits the current condition to the information processing device, and
 the information processing device
  receives the result of the analyzing from the mobile information terminal,
  judges whether the selected content should be provided to the mobile information terminal or not based on whether the received current condition has been continuously been a non-normal condition for a fixed period of time, and
  transmits the selected content to the mobile information terminal when judging that the content should be provided to the mobile information terminal.

5. The information providing system according to claim 1, wherein the information processing device provides content of a store including a place to rest when the result of the analyzing is that the user needs a rest.

6. The information providing system according to claim 1, wherein
 the information processing device stores a facility information table that indicates correspondence relationship between a time period of an event held by a store and first category information indicating a category to which merchandise or service provided by the store holding the event belongs, and
 the information processing device updates relevant category information in a relevant category information table, indicating correspondence relationship between category information indicating a category to which merchandise or service provided by a store belongs and the relevant category information relevant to the category information, to the first category information when the result of analyzing indicates that the condition of the user is normal and a present time is in the time period of the event.

* * * * *